United States Patent [19]
Sanderson et al.

[11] Patent Number: 5,151,571
[45] Date of Patent: Sep. 29, 1992

[54] ELECTRON BEAM WELDING

[75] Inventors: Allan Sanderson; Colin N. Ribton, both of Cambridge, England

[73] Assignee: The Welding Institute, Cambridge, England

[21] Appl. No.: 692,233

[22] Filed: Apr. 26, 1991

[30] Foreign Application Priority Data

May 4, 1990 [GB] United Kingdom ............... 9010186

[51] Int. Cl.$^5$ ............................................. B23K 15/00
[52] U.S. Cl. ............................ 219/121.13; 219/121.28
[58] Field of Search ...................... 219/121.13, 121.14, 219/121.28, 121.29

[56] References Cited

U.S. PATENT DOCUMENTS

| | | | |
|---|---|---|---|
| 4,020,318 | 4/1977 | Sanderson | 219/121.12 |
| 4,229,639 | 10/1980 | Koy et al. | 219/121.14 |
| 4,321,453 | 3/1982 | Terai et al. | 219/121.14 |
| 4,376,886 | 3/1983 | Sciaky et al. | 219/121.14 |
| 4,644,126 | 2/1987 | Schumacker | 219/121 ED |

FOREIGN PATENT DOCUMENTS 2055317A 3/1981 United Kingdom .

OTHER PUBLICATIONS

Connect, "Leading Edge" p. 2, No. 8, Apr. 1990.

*Primary Examiner*—C. L. Albritton
*Attorney, Agent, or Firm*—Martin Novack

[57] ABSTRACT

An electron beam welding system having improved deep penetration weld characteristics in which the electron beam is repeatedly deflected from an undeflected nominal position, as the beam traverses along a weld zone, to build up a heat distribution pattern in the vicinity of the weld zone. The heat distribution pattern is made up of a number of substantially distinct zones of different heat density with a preferred pattern comprising three zones with a space between the first and second zones. The third zone leads the second zone and the space trails the second zone in the direction of traversal of the beam with the maximum heat density occurring in the second zone.

9 Claims, 8 Drawing Sheets

| | | X | Y DEFLECTION |
|---|---|---|---|
| PART OF PREVIOUS DWELL (b') | 20 | -4 | -38 |
| | 21 | -4 | -38 |
| RAMP PART OF ZONE C (c'') | 22 | 120 | -31 |
| | 23 | 104 | -29 |
| | 24 | 90 | -30 |
| | 25 | 74 | -32 |
| | 26 | 58 | -31 |
| | 27 | 44 | -32 |
| | 28 | 26 | -30 |
| | 29 | 10 | -32 |
| DWELL IN PART OF ZONE B (b'') | 30 | -2 | -32 |
| | 31 | -2 | -32 |
| | 32 | -2 | -32 |
| | 33 | -2 | -32 |
| | 34 | -2 | -32 |
| | 35 | -2 | -32 |
| | 36 | -2 | -32 |
| | 37 | -2 | -32 |
| | 38 | -2 | -32 |
| | 39 | -2 | -32 |
| | 40 | -2 | -32 |
| | | X | Y DEFLECTION |

DETAIL OF ZONES B & C

| | X | Y DEFLECTION |
|---|---|---|
| 200 | -4 | 40 |
| 201 | -4 | 40 |
| 202 | -4 | 40 |
| 203 | -4 | 40 |
| 204 | -4 | 40 |
| 205 | -4 | 40 |
| 206 | -4 | 40 |
| 207 | -254 | 127 |
| 208 | -210 | 96 |
| 209 | -252 | 62 |
| 210 | -208 | 32 |
| 211 | -254 | 1 |
| 212 | -210 | -31 |
| 213 | -256 | -62 |
| 214 | -210 | -93 |
| 215 | -252 | -124 |
| 216 | -162 | -123 |
| 217 | -192 | -62 |
| 218 | -162 | 2 |
| 219 | -194 | 63 |
| 220 | -160 | 126 |
| | X | Y DEFLECTION |

LAST ELEMENT b OF ZONE B COMPLETED

START OF ZONE A RASTER SAW TOOTH

DETAIL OF ZONE A

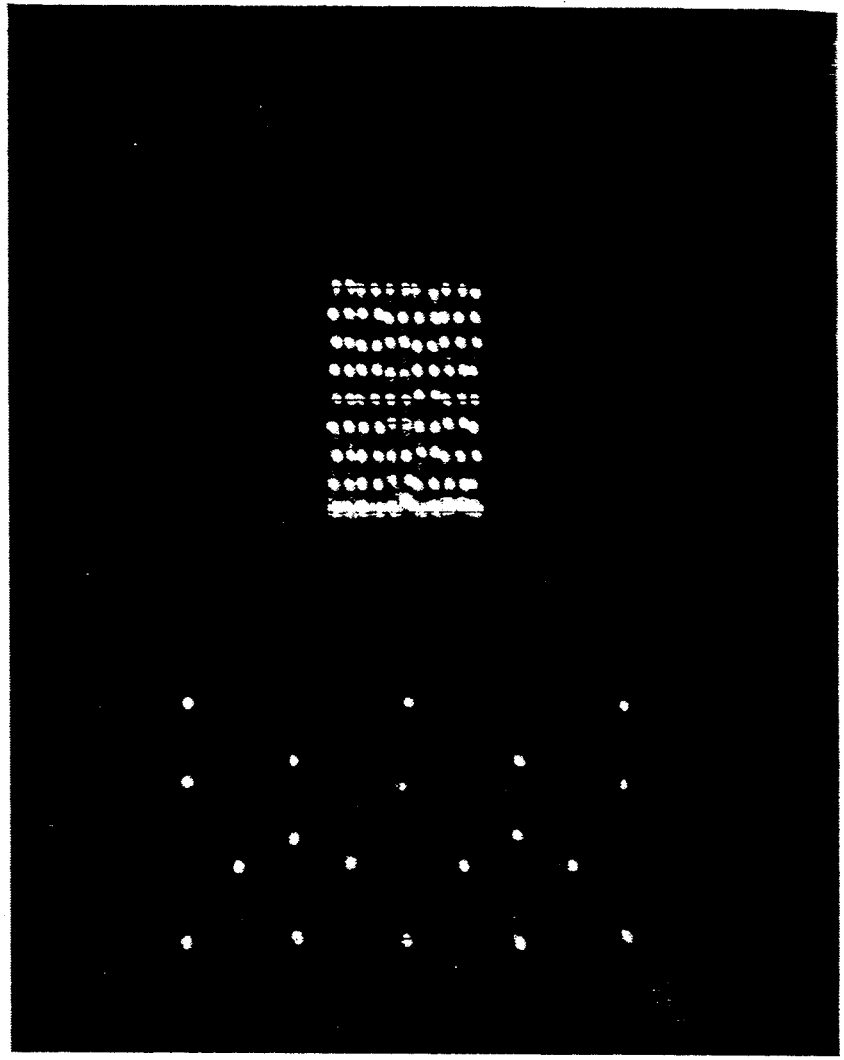

y DEFLECTION, 2mS TIMEBASE TRANSVERSE SCAN

ELECTRON BEAM WELDING

FIELD OF THE INVENTION

This invention relates to electron beam welding, especially for deep penetration of thick materials.

DESCRIPTION OF THE PRIOR ART

Oscillation of the beam about its axis in electron beam welding is well known in which the beam is deflected in line with the welding seam, or alternatively transverse to the weld seam, or yet again in a circular or elliptical manner. Here the amplitude of oscillation is generally low, of the order of 1 mm or less, and at relatively high frequency such as 1 kHz and upwards and of a nominally sinusoidal waveform. Such oscillation causes the beam to traverse a simple path in a harmonic manner. Such oscillation can be beneficial in electron beam welding in promoting out-gassing of the weld capillary (to avoid porosity) and in improving metal flow (to avoid solidification defects). However, in deep penetration welding in excess of say 50 mm, it is difficult to find a single oscillation pattern and frequency which is advantageous to both out-gassing and metal flow characteristics. Frequently this leads to a broadening of the fused zone and consequently a reduction in the depth to width ratio. One disadvantage of this problem is particularly evident in attempting to make a deep penetration weld in a component of limited heat sink, such as when welding close to an exposed or unsupported face in the component.

U.S. Pat. No. 4,376,886 describes an electron beam welding process in which the electron beam is deflected from point to point of a matrix of spots over which the beam rests for a certain period of time. This produces a distribution of energy over a defined area along the surface of the material being welded. Similarly in Connect page 2, No. 8, April 1990, an electron beam welding machine is described which uses an electron beam deflected to points in a matrix pattern to produce a heat distribution on a workpiece surface. Although these two systems constitute an improvement over the simple harmonic oscillating beam welder the problems described above are found to be still substantially present.

SUMMARY OF THE INVENTION

In accordance with one aspect of the present invention, a method of electron beam welding in which an electron beam is traversed along a weld zone is characterised in that the electron beam is deflected from a nominal position so as to generate substantially distinct zones of different heat density about the nominal position of the beam.

In accordance with another aspect of the invention, electron beam welding apparatus comprises electron beam generating means; and first control means for causing the electron beam to traverse along a weld zone characterised by second control means adapted to cause the electron beam to be deflected from a nominal position so as to generate substantially distinct zones of different heat density about the nominal position of the beam.

Thus, the beam is deflected in a repeating pattern to give the preferred heat distribution pattern in the vicinity of the nominal beam position. Furthermore, the detailed heat distribution pattern is divided into a plurality of zones in the overall distribution which differ in relative heat density, one from another.

The beam may be deflected in such a manner that effectively the instantaneous beam power is distributed in a plurality of zones which may differ in extent both longitudinally and transversely and in relative time duration while the distribution is repeated sufficiently frequently for the beam overall to appear to operate in such a distributed manner. Typically, the zones comprise a forward area and a rearward area relative to the direction of movement of the nominal position of the beam along the weld zone. These zones may be contiguous or separated or alternatively overlapped as desired. Preferably, the distribution cycle is repeated before the relative movement of the nominally undeflected beam and workpiece is greater than beam diameter at focus or greater than 0.1 mm whichever is the less.

A preferred heat distribution pattern comprises three zones of different heat density with a space between the first zone and the second zone, the third zone leading the second zone and the space trailing the second zone, in the direction of traversal of the electron beam along the weld zone, the third zone being substantially contiguous with the second zone.

Such distributed heat patterns can be generated by suitable ramp generators on X and Y deflection electromagnetic coils. The ramp generators are preferably co-ordinated to give a raster over the desired area for the relative time duration required with change to another raster area in sequence until the complete distribution pattern is obtained. This cycle of events is then repeated.

Although analogue ramp signals can be utilised, an alternative is to define the preferred distribution as a series of points in the X-Y plane about the undeflected beam axis with the beam deflected to each point in a predetermined sequence for a finite period, which may be repeated as often as desired before passing on to the next point or series of points defining the pattern. One convenient method utilises a microcomputer to store the program of points such as a pattern of 256 points which is repeated at a moderate frequency, say 140 Hz, for deep penetration welding of steel, giving nominally about 36,000 points per second. If the transit time between individual points is less than say microsecond, then the corresponding operating or dwell time is of the order of 27 microseconds at each point (or 28 microseconds if the particular point is being repeated).

The nominal position of the beam is usually understood to mean the undeflected position of the beam, that is the beam axis without the application of a specific deflection pattern according to the invention. However, for searching a particular seam or weld line, the beam could well be deflected from its inherent gun axis. Such deflections are for overall positioning of the beam with respect to the workpiece and the deflection pattern of the invention is superposed on this.

BRIEF DESCRIPTION OF THE DRAWINGS

Some examples of methods according to the invention will now be described with reference to the accompanying drawings, in which:-

FIGS. 6a–6c are oscillograms of typical deflection patterns;

DETAILED DESCRIPTION OF AN EMBODIMENT

Conventional electron beam welding equipment can be used to implement the invention such as that described in U.S. Pat. No. 4,020,318 but with the controlling microprocessor suitably programmed, and deflection coils of low inductance.

Figure 1:
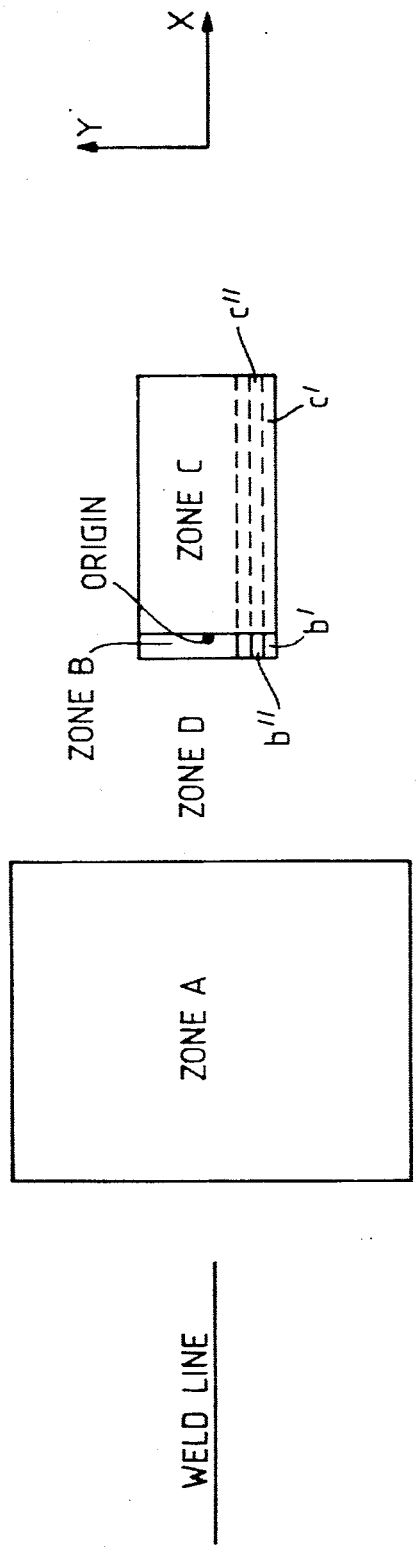
FIG. 1 illustrates a typical beam deflection pattern.
Figure 2:
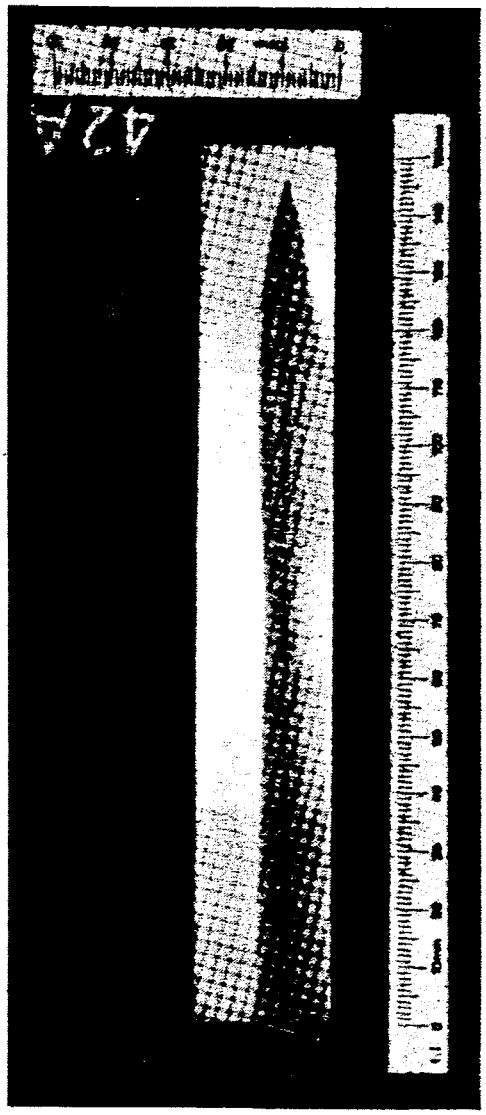
FIG. 2 illustrates the degree of penetration achieved in a steel workpiece.

As a specific example, a pattern is described which is particularly beneficial in developing deep penetration as well as providing subsidiary benefits such as reducing cavitation porosity and undercut to acceptable limits in electron beam welding of steel with a depth to width ratio exceeding 10:1. The power distribution pattern featuress three major zones A, B, and C, together with a space D between zones A and B, as illustrated in FIG. 1. Maximum penetration occurs in the region of zone B, with zone C leading and zone D trailing this region. It is noted that zone C is substantially contiguous with zone B and that zone B comprises largely transverse deflection of the beam with nominally no or only a slight longitudinal deflection. Also, zone A may be scanned in a broad raster with a sawtooth pattern whereas zone C may be scanned in a sequence of longitudinal lines which are displaced transversely in turn. Although alternative arrangements of scan giving similar heat distributions can be used, the sequence described below has been found particularly beneficial in deep penetration of thick steel, as exemplified in FIG. 2. It is noted that in the latter illustration the deep and narrow penetration has been obtained relatively close to an open or exposed edge of the steel material which is less than nominally 10 mm away. (The relative imbalance in heat sink is illustrated by the heat affected zone (HAZ) which is asymmetrically distributed about the narrow fused zone of the deep penetration weld).

In general in such a distribution pattern, FIG. 1, some 3–15% of the overall distribution cycle time is expended in zone A, which extends rearward of zone B typically over some 2–5 mm and extends transversely typically over some 2–5 mm Preferably, the relative time spent in zone A is of the order of 5–10 % of the overall cycle time. Equally, the dimensions of the zone may be extended by 35% or reduced by 25% in either the longitudinal or transverse direction, or both. Preferably, for greater dimensions of zone A, the fractional time should be increased, and vice versa. Typically, the mean energy density in zone A is in the region of 0.5–2% of that of zone B, which represents the region where maximum penetration is expected.

Preferably, zone A is separated from zone B by a blank zone D. The longitudinal dimension of zone D may extend from 0–4 mm and preferably is in the region of 3 mm. The highest intensity zone B is of lesser transverse width than zone A and typically is in the region of 1.5 mm in width. The overall relative time duration for zone B is of the order of 40–75% of the overall cycle period. Preferably, the relative time period for zone B is some 50–65% of the overall time period.

Zone C is of the same order of transverse width as zone B but may range from 35% greater to 25% less in width and also extend longitudinally for some 1.5–4 mm. Preferably, the longitudinal extent is in the region of 3 mm. The relative time period for zone C is in the range 20–45% of the overall cycle period. Preferably, the relative time is in the range of 30–40%. Zone C is preferably continguous with zone B. Alternatively a small degree of overlap or a small spacing may also be arranged. Typically, the mean energy density in zone C is in the region of 5–20% of that in zone B, where maximum penetration is developed.

The overall cycle of zone A, space D, zone B and zone C may each be completed in sequence, or alternatively parts of zones completed in increments. For example, zone A may be completed entirely and spaced from zone B and then one element b' of zone B completed together with corresponding element c' of zone C. These are followed in turn by a second element b" and corresponding element c" of zones B and C, and so forth until the whole of zones B and C have been completed. This approach is convenient particularly where the width of zone C corresponds to the width of zone B in the transverse direction.

Figure 3:
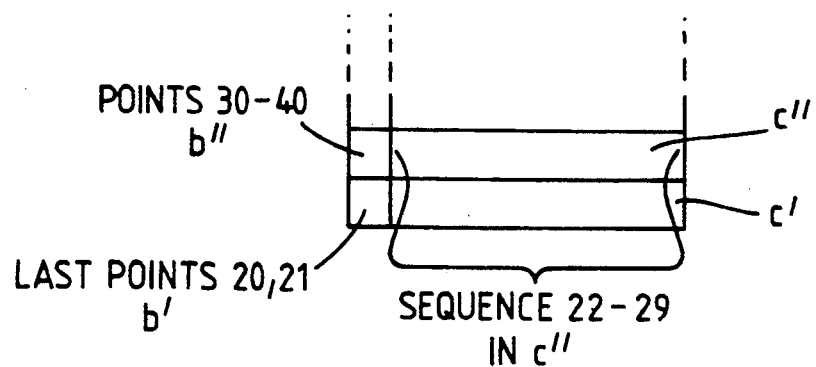
FIG. 3 illustrates an example of a digital sequence for zones B and C in FIG. 1.

An example of the digital deflection sequence is shown in the table of FIG. 3, which defines a succession of points relating to zones B and C. It is noted that the beam is deflected to the forward edge of zone C and then progressively returns along a line parallel to the weld seam to provide an element c" and finally rests in zone B for a succession of unit time intervals, to provide an element b". Thus, for example, the element b" may comprise some 8–15 repetitions in the one position b" at the end of a sequence of some 6–12 steps in the element c". (It is noted that this is equivalent to an analogue signal for X deflection with a fast rise and slow return together with a dwell period in a sawtooth-type ramp generator.) Also, the distribution of the beam in zone B may be conveniently varied in the transverse direction by altering the number of repetitions (effective dwell period) for each element b.

Figure 4:
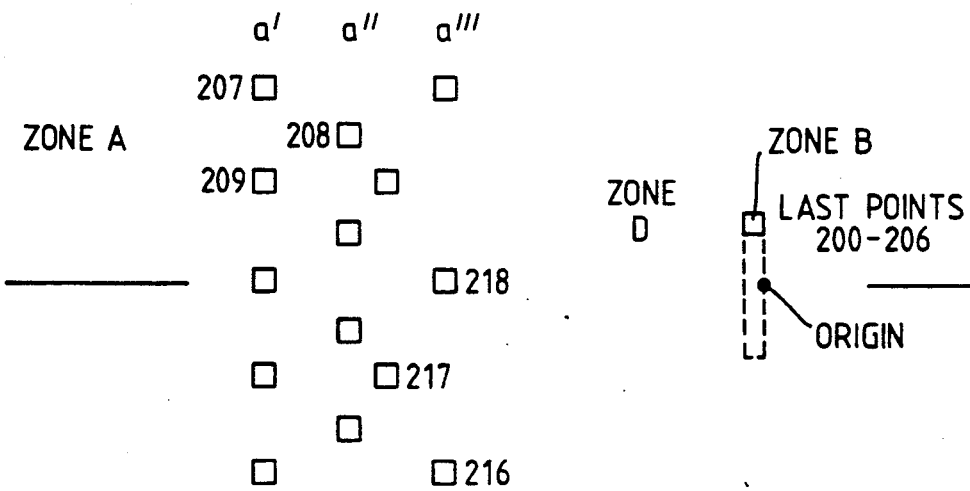
FIG. 4 illustrates an example of a digital sequence straddling zone D in FIG. 1.

Another example of the digital deflection sequence is shown in the table of FIG. 4, which defines a succession of points relating to zone A after zone B is completed. Here the beam is deflected to the rearward edge of zone A and then starts to cover part of this zone in a zigzag fashion such that there is a variation in energy density in element a' compared with elements a" and a'". It is noted that the energy density is highest in element a" and that overall elements a' and a" have a higher energy density than element a'". Such detailed variation in the energy distribution within a major zone is readily accomplished using the digital deflection system, compared with generating analogue ramp waveforms.

The relative time duration of the beam in any major zone is also readily defined by the relative number of points, in this case out of 256. Equally, the mean power density in a major zone is defined by the number of points divided by the scanning area of the zone. Thus the relative energy density between one zone and another is given by $(N1/N2)^2 \times (A2/A1)$, where N is a number of points and A the area of zones 1 and 2 respectively.

Preferably the minimum duration of the beam with respect to any one element of the deflection pattern in a given sequence is not less than say 10μsec. (for such an element a in zone A, or any one step in the sequence c in zone C) and the maximum duration not more than say 5 m sec. in the most intense parts, such as in zone B. In the example given, the dwell duration is of the order of 0.25 m sec. in any one element b of zone B, and preferably this should not exceed say 1 msec. in any part of the sequence. If longer overall durations are required for an element such as element b in zone B, then preferably the elements b are repeated in the overall sequence both before and after each individual sequence of the elements c in zone C, and/or the elements comprising zone B may be sequenced before and after the whole of zone C, and so forth.

Yet again zone B may be scanned in the transverse (ie. y) direction for a number of repetitions with a limited duration at each element b to build up the desired total fractional duration for zone B in the overall sequence.

Figure 5:
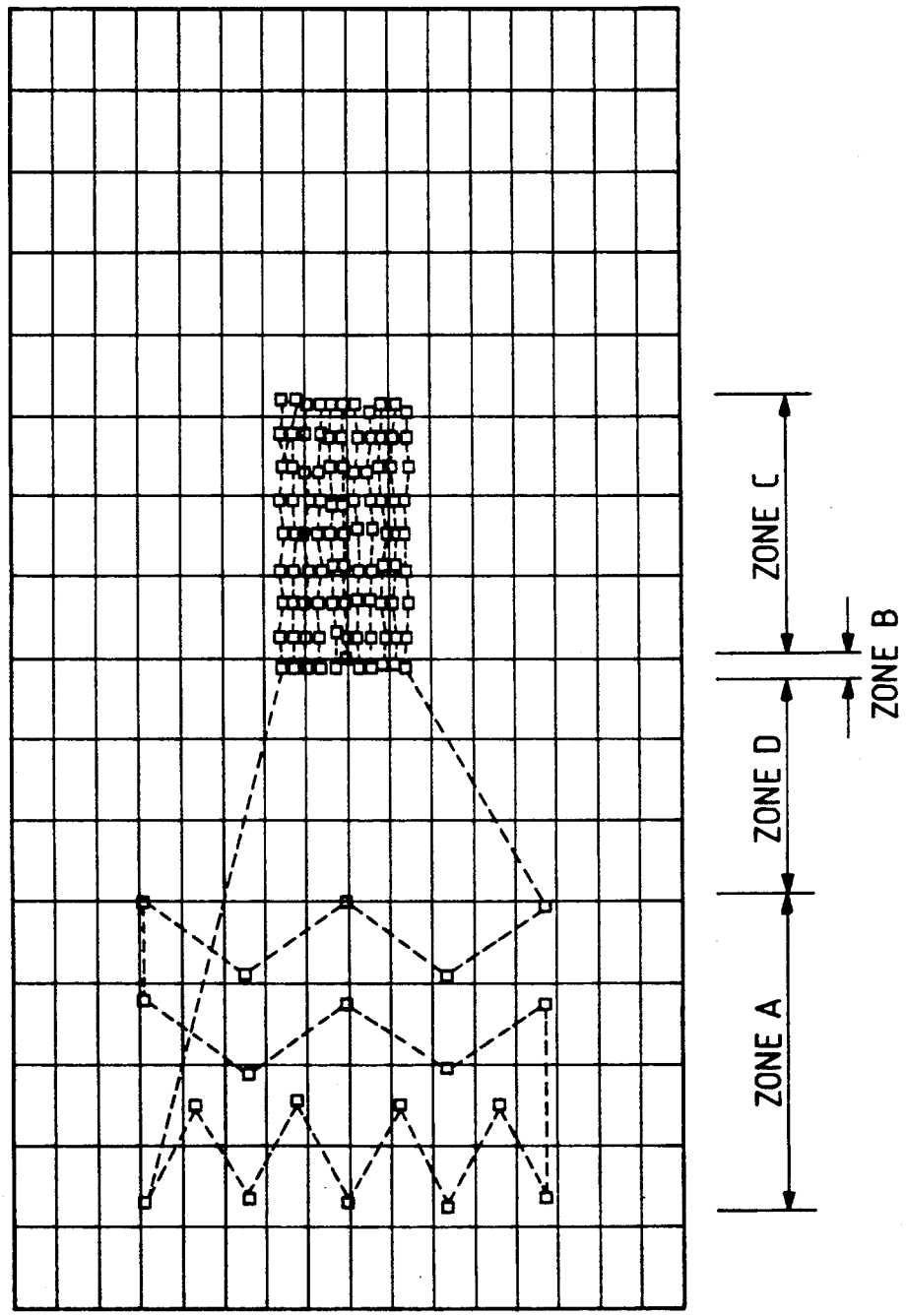
FIG. 5 illustrates a complete deflection pattern.

An example of a complete pattern distribution is given in FIG. 5, which corresponds to the program stored in a microcomputer defining the relative X-Y locations of all the points in zones A, B and C, together with the spacing of zone D. In this example the beam resides in zone A for more than 5% and in zone C for more than 30% of the overall cycle time, (with less than 3% nominally zero, in zone D). The remainder of the cycle is expended in zone B. It is also noted that zone A is scanned largely in a transverse manner, whereas zone C is scanned in a longitudinal manner with fast advance to the leading edge and a slow return to the zone B where the beam dwells. This digital pattern is scaled and via a D-A converter is applied to the X and Y deflection coils of the electron beam system via suitable power amplifiers.

Figure 6B:
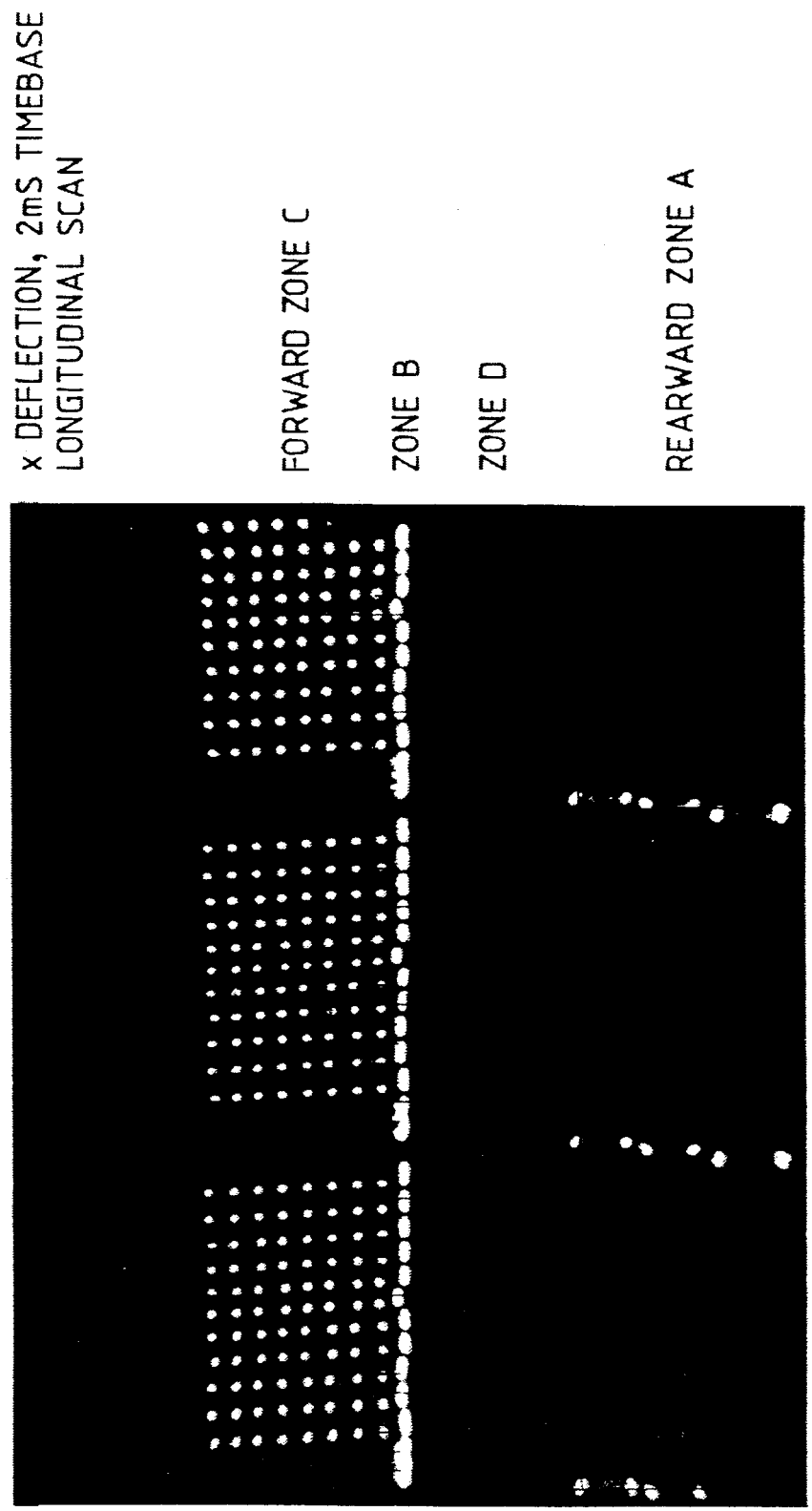
Figure 6C:
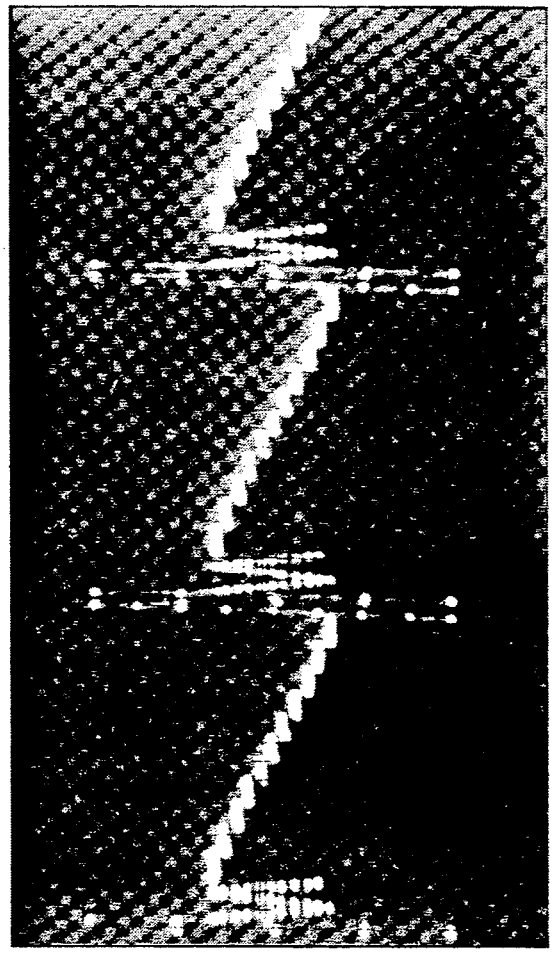

Although in principle each point in the digital program represents a discrete step, there is a finite build-up rate in the analogue deflection depending on the inductance of the deflection coils and the driving voltages available. An example is shown by the oscillograms FIG. 6, of the change in current for both small and large discrete steps, where the small steps appear substantially as a ramp and the larger as a discontinuity, albeit with an exponential response.

Figure 7:
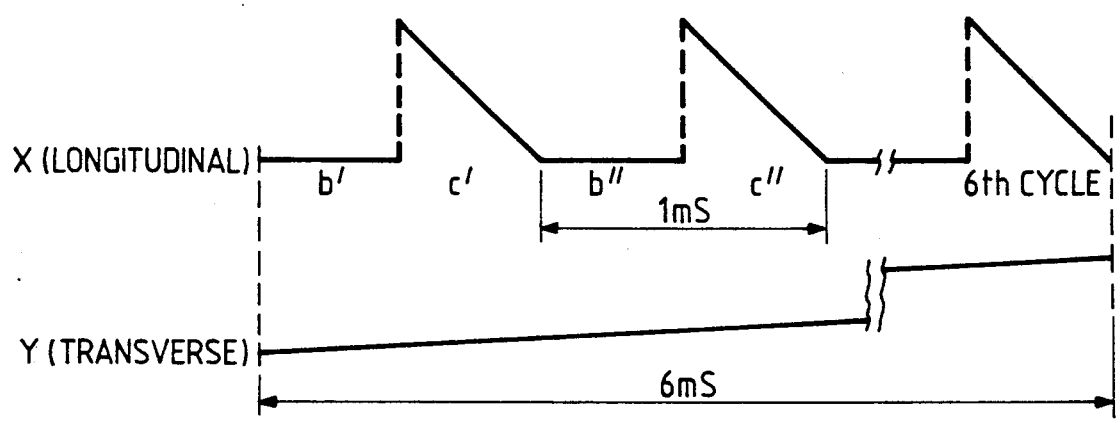
FIG. 7 illustrates ramp signals for zones B and C.

Alternatively, the analogue signals can be derived directly from ramp generators (FIGS. 7 and 8), particularly for the simpler patterns comprising the major zones alone without a sub-zone structure. Thus, for example, a zone can comprise a simple ramp waveform in the longitudinal direction in conjunction with a higher frequency oscillation, preferably of a sawtooth waveform, in the transverse direction. Thus, the zones C and B can be generated by a simple triangular ramp (with a fast rise and slow return) together with a waiting period at the initial point corresponding to zone B. The transverse width of zones B and C can be provided by a higher frequency sawtooth to produce a band of heating which is modulated according to the ramp waveform, giving a relatively high energy density in zone B and a lower energy density in zone C. It is noted that the time duration of the deflected portion of the ramp waveform, zone C, is of similar order to the time duration of the undeflected portion, zone B, of the same waveform. The deflected portion may have a relative time of some 30-70% of the overall cycle.

Yet again the transverse width can be provided by a ramp waveform symmetrically disposed about the centre point (FIG. 7), which is preferably synchronised with the longitudinal ramp waveform generating zones C and B.

The transverse ramp is of sufficient duration to contain a whole number of the longitudinal ramp cycles, for example of 6 milliseconds duration to contain nominally 6 complete cycles of the longitudinal ramp of 1 millisecond total duration for each element b and c of the overall zone B and C.

Figure 8:
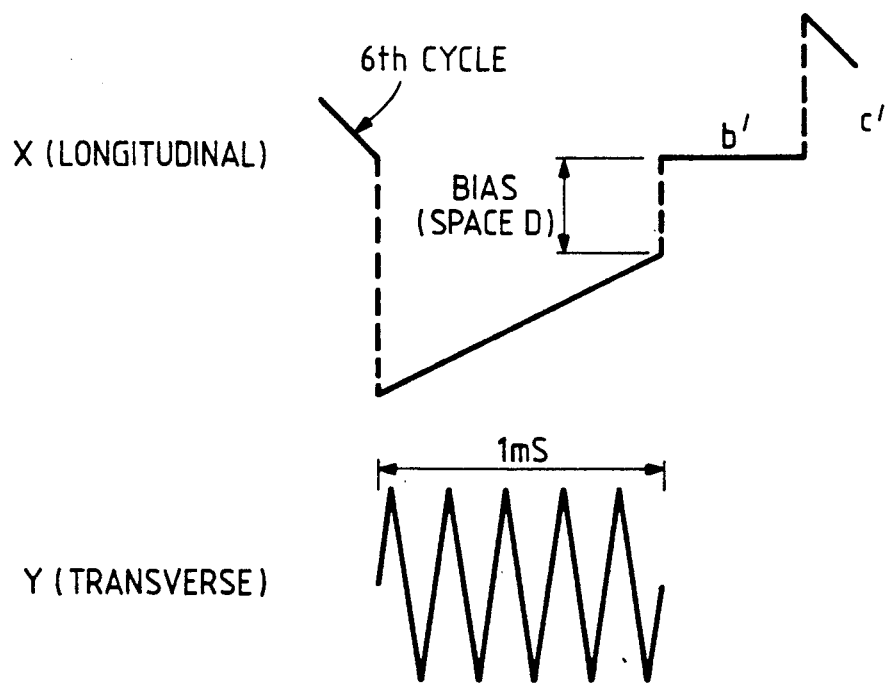
FIG. 8 illustrates a ramp signal for zone A.

Similarly, for Zone A a longitudinal waveform includes a bias (corresponding to the space D) together with a linear ramp corresponding to the longitudinal extent of zone A. This again is accompanied by a higher frequency, preferably sawtooth oscillation, in a transverse direction (FIG. 8). It is noted that the amplitude of the transverse oscillation for zone A is generally different from the corresponding amplitude for zones B and C and may, for example, be some two to three times greater. The time duration of the longitudinal ramp in zone A is short, for example millisecond, so that together with the overall time for the ramps for zones B and C the cycle is completed in nominally 7 milliseconds, corresponding to a repeat frequency of about 140Hz. For zone A the transverse amplitude can be provided by a higher frequency oscillator such as a sawtooth generator of upwards of, say, 5 kHz.

To avoid beat frequency effects, the higher frequency oscillation is preferably co-ordinated with the ramp generator to give substantially a whole number of the higher frequency oscillation cycles during the ramp waveform. One method of achieving the required co-ordination is to use the higher frequency waveform to generate the ramp. For example, the higher frequency sawtooth wave may be rectified and used to discharge a precharged capacitor to provide a ramp. This ramp then consists of a series of incremental steps which is satisfactory in practice.

Other waveforms providing in effect a raster for the various zones A, B, and C can also be used to generate the distributed pattern as described.

We claim:

1. A method of electron beam welding wherein an electron beam is traversed along a weld zone, said electron beam being deflected from a nominal position so as to generate substantially distinct zones of different heat density about said nominal position of said electron beam.

2. A method of electron beam welding according to claim 1, wherein said zones of different heat density comprise a forward area and a rearward area, relative to a direction of traversal of the nominal position of said electron beam along said weld zone.

3. A method of electron beam welding according to claim 1, wherein said electron beam is deflected in a repeating pattern to give a heat distribution pattern in the vicinity of said nominal position of said electron beam, said heat distribution pattern comprising said zones of different heat density, and said heat distribution pattern being repeated cyclically.

4. A method of electron beam welding according to claim 3, wherein each cycle of said heat distribution pattern is repeated before a traversal in said direction of said electron beam in said nominal position along said weld zone is greater than one beam diameter at focus or greater than 0.1 mm which ever is less.

5. A method of electron beam welding according to claim 3, wherein said heat distribution pattern comprises a first zone, a second zone and a third zone each of different heat density with a space between said first zone and said second zone, said third zone leading said second zone and said space trailing said second zone, in said direction of traversal of said electron beam along said weld zone, said third zone being substantially contiguous with said second zone.

6. A method of electron beam welding according to claim 5, in which a maximum heat density occurs in said second zone.

7. A method of electron beam welding according to claim 3, wherein said heat distribution pattern is generated by ramp generators on X and Y deflection electromagnetic coils.

8. A method of electron beam welding according to claim 3, wherein said heat distribution pattern is defined as a matrix of points about said nominal position of said electron beam and said electron beam being deflected to each of said points in a predetermined sequence.

9. Electron beam welding apparatus comprises an electron beam generating means; a first control means for causing an electron beam to traverse along a weld zone; and a second control means adapted to cause said electron beam to be deflected from a nominal position so as to generate substantially distinct zones of different heat density about said nominal position of said electron beam.

* * * * *